Dec. 15, 1925.
H. PAVIA
SHUTTLE
Filed Dec. 12, 1924
1,566,113
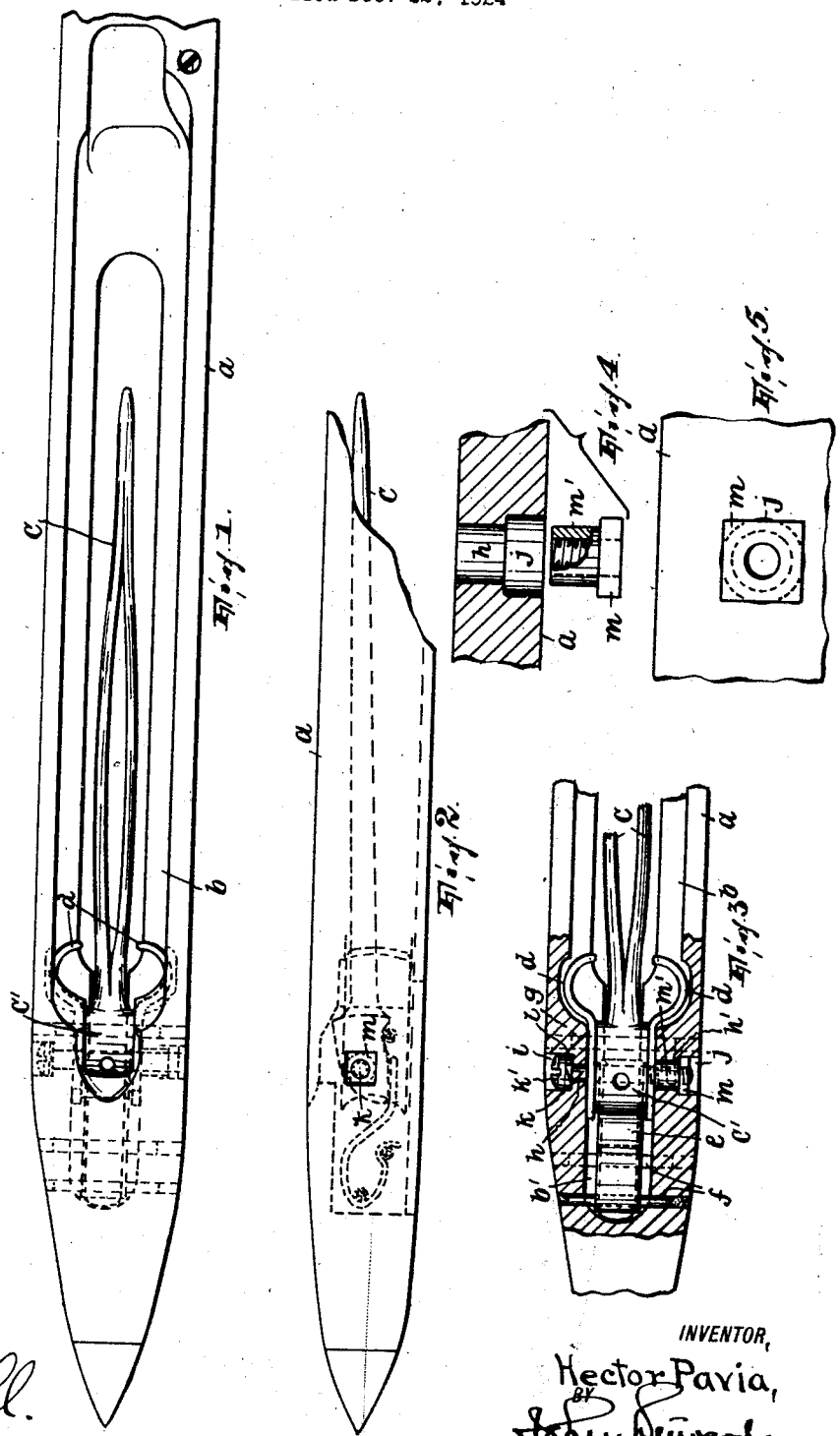
WITNESS
INVENTOR,
Hector Pavia,
ATTORNEY.

Patented Dec. 15, 1925.

1,566,113

UNITED STATES PATENT OFFICE.

HECTOR PAVIA, OF ALLENTOWN, PENNSYLVANIA.

SHUTTLE.

Application filed December 12, 1924. Serial No. 755,410.

*To all whom it may concern:*

Be it known that HECTOR PAVIA, a citizen of the United States, residing at Allentown, in the county of Lehigh and State of Pennsylvania, has invented certain new and useful Improvements in Shuttles, of which the following is a specification.

In shuttles for looms in which the spindle is pivoted to swing outward to facilitate applying and removing the quill or cop the pin used as a pivot for the spindle works out of place and is likely then to injure the loom reed and do other damage. This is because it is a plain pin, with nothing to secure it but its frictional contact with the hole receiving it. The object of this invention is to provide a shuttle construction in which the pin will not work loose, and also to accomplish this purpose without harmful change in the shuttle structure.

In carrying out my invention I use to form the pin or pivot for the spindle a metal screw. It is not practicable to screw the screw into the shuttle body itself, because the latter is of wood or some other relatively soft material; and so I provide a screw-hold for the screw which is of metal but which is so mounted in the shuttle-body as to be virtually a part of the same so far as any freedom to rotate is concerned. This I accomplish by forcibly driving the screw-hold device into the shuttle, preferably into a countersink of the hole for the screw which the device will not enter without application of considerable force; in the best form this device is angular or faceted and is driven into a circular countersink, so that even on shrinkage of the wood of the shuttle-body it would remain virtually a part of the same as far as any ability to turn is concerned. The screw itself may be held against turning by a lock-washer of the spring type. When the pivot is thus constructed I find that it is permanently held against any tendency as a whole or in part to loosen in any way, so that all trouble incident to the use of plain pins is entirely overcome. When the screw-hold device is driven home the extent to which it is forced in should be gaged so as not to displace inward the wood of the shuttle and weaken the same; and for this purpose I preferably provide a spacing sleeve which is adapted to bear against the adjoining metal piece which flanks the spindle-butt and forms one of the clips to keep the quill on the spindle, and if this is in one piece with said device and is threaded to correspond the screw-hold afforded the screw will be to that extent increased.

In the drawing,

Fig. 1 is a plan view of the improved shuttle;

Fig. 2 is a side elevation;

Fig. 3 is a view of a fragment of the shuttle showing the same in horizontal section; and Figs. 4 and 5 are detail views showing the manner of assembling the screw-hold device with the shuttle body.

The shuttle body $a$ is formed of wood or other non-metallic substance and it has the usual cavity $b$ for the quill or cop tube of the wound package to be placed on the spindle $c$, which is arranged to be shifted up-and-down on a horizontal transverse axis as usual. $b'$ is the extension cavity receiving the enlarged butt $c'$ of the spindle and having flattened sides, and $d$ designates the metal clips which flank the butt of the spindle in the usual way and extend into the cavity $b$. $e$ is the spindle spring supported as usual by the pins $f$, and $g$ is the usual stop-pin to limit the downward movement of the spindle.

For the pivoting of the spindle the improved construction is as follows: A hole $h$ is driven through the shuttle body at a point for proper alinement therewith of the usual holes in the spindle butt $c'$ and clips $d$. This hole is enlarged at $h'$ and is formed at its ends with the countersinks $i$ and $j$. $k$ is a metal screw having a head $k'$ and adapted to be fitted to the hole with its head $k'$ set into the countersink $i$ as shown. Between the head and the bottom of the countersink is a spring lock-washer $l$. $m$ is the screw-hold device here formed square and of metal and having its diagonals greater than the diameter of the countersink $j$. After the countersink is formed this device is by pressure forced into the same so that it stands in the shuttle body with a driven fit and so is practically a part of said body. Figs. 4 and 5 show the device before it is forced into the countersink and Fig. 3 most clearly shows it after it has been embodied in the shuttle body. The device is forced in until it reaches the plane of the bottom of the countersink.

In order to prevent over-driving the device $m$ into the countersink, with the disadvantages mentioned. I utilize the adjoining clip $d$ as a stop or abutment, interposing a sleeve $m'$ which is of metal and may be and as here shown is integral with the device $m$ and is equal in length to the distance between the planes of the bottom of countersink $j$ and the said clip and occupies the enlargement $h'$ of hole $h$. This sleeve, when integral with device $m$ and if threaded as shown in Fig. 4, affords extended threaded engagement between the screw and said device.

After device $m$ has been embodied in the shuttle body it will be understood that the parts are assembled by screwing the screw thereinto, through the washer $l$ and the clips and spindle butt.

Having thus fully described my invention what I claim and desire to secure by Letters Patent is:

1. In combination, a shuttle body having a cavity for the wound package formed with an extension, the part of the body containing said extension having a hole penetrating said body and traversing said extension transversely thereof and formed at one end with a countersink, a pivoted spindle having its butt in the extension, a metal piece arranged between the spindle-butt and that side of said extension which adjoins the countersink, a metal screw-hold device driven into the countersink with a driven fit and thereby held by the body against turning, a sleeve in said hole spacing said device and piece and abutting the latter, a screw penetrating said hole and the spindle-butt and sleeve and forming the pivot for the spindle and having one end threaded and screwed into said device and its other end within the hole, and means to hold the screw against turning.

2. In combination, a shuttle body having a cavity for the wound package formed with an extension, the part of the body containing said extension having a hole penetrating said body and traversing said extension transversely thereof and formed at one end with a countersink, a pivoted spindle having its butt in the extension, a metal piece arranged between the spindle-butt and that side of said extension which adjoins the countersink, a metal screw-hold device driven into the countersink with a driven fit and thereby held by the body against turning, a sleeve in said hole spacing said device and piece and abutting the latter and formed integral with the former and internally threaded, a screw penetrating said hole and the spindle-butt and forming the pivot for the spindle and having one end screwed into the sleeve and its other end within the hole, and means to hold the screw against turning.

In testimony whereof I affix my signature.

HECTOR PAVIA.